US011835534B2

(12) United States Patent
Zhang

(10) Patent No.: US 11,835,534 B2
(45) Date of Patent: Dec. 5, 2023

(54) AUTOMATIC CLEANING AND SEPARATING DEVICE

(71) Applicant: SHENZHEN INCRECARE BIOTECH CO. LTD, Shenzhen (CN)

(72) Inventor: Zhen Zhang, Shenzhen (CN)

(73) Assignee: SHENZHEN INCRECARE BIOTECH CO. LTD, Shenzhen (CN)

( * ) Notice: Subject to any disclaimer, the term of this patent is extended or adjusted under 35 U.S.C. 154(b) by 1119 days.

(21) Appl. No.: 16/493,351

(22) PCT Filed: Dec. 26, 2017

(86) PCT No.: PCT/CN2017/118633
§ 371 (c)(1),
(2) Date: Sep. 12, 2019

(87) PCT Pub. No.: WO2019/127016
PCT Pub. Date: Jul. 4, 2019

(65) Prior Publication Data
US 2020/0132706 A1 Apr. 30, 2020

(51) Int. Cl.
*G01N 35/02* (2006.01)
*G01N 35/04* (2006.01)

(52) U.S. Cl.
CPC ............ *G01N 35/025* (2013.01); *B01L 13/02* (2019.08); *G01N 35/04* (2013.01); *G01N 2035/0437* (2013.01)

(58) Field of Classification Search
CPC ................. G01N 35/04; G01N 35/025; G01N 2035/00356; G01N 2035/0444;
(Continued)

(56) References Cited

U.S. PATENT DOCUMENTS 7,794,659 B2 *  9/2010  Lair ........................ G01N 35/04
                                                    422/65
10,717,087 B2 *  7/2020  Yasui ................. G01N 35/1004
(Continued)

FOREIGN PATENT DOCUMENTS

CN        201926657 U      8/2011
CN        103599898 A      2/2014
(Continued)

OTHER PUBLICATIONS

International Search Report, and English Translation thereof, for International Application No. PCT/CN2017/118633, dated Jun. 27, 2018 (5 pages).
(Continued)

*Primary Examiner* — Shogo Sasaki
(74) *Attorney, Agent, or Firm* — Kagan Binder, PLLC

(57) ABSTRACT

Disclosed is an automatic cleaning and separating device for removing uncombined components in reactants in a reaction container. The automatic cleaning and separating device includes: a liquid injection and uniform mixing mechanism, a removal assembly and a liquid suction mechanism; wherein a liquid injection driver is mounted on the liquid injection and uniform mixing mechanism, a liquid suction driver is mounted on the liquid suction mechanism, the liquid injection driver drives the liquid injection and uniform mixing mechanism to move up and down so as to complete liquid injection, the liquid suction driver drives the liquid suction mechanism to move up and down to complete liquid suction, and the removal assembly removes the reaction container from the liquid injection and uniform mixing mechanism under the relative motion of the liquid suction mechanism and the liquid injection and uniform mixing mechanism.

8 Claims, 4 Drawing Sheets

(58) Field of Classification Search
CPC . G01N 2035/0437; B08B 9/093; B01L 13/02; B01L 2200/0647; B01L 9/06; B01L 2200/0631; B01L 2400/043
See application file for complete search history.

(56) References Cited

U.S. PATENT DOCUMENTS

| | | |
|---|---|---|
| 11,162,962 B2 | 11/2021 | Zhang |
| 11,268,970 B2 | 3/2022 | Zhang |
| 11,619,642 B2 | 4/2023 | Zhang |
| 2017/0088831 A1 | 3/2017 | Wang et al. |
| 2017/0292966 A1 | 10/2017 | Yu et al. |

FOREIGN PATENT DOCUMENTS

| | | |
|---|---|---|
| CN | 104722526 A | 6/2015 |
| CN | 205301341 U | 6/2016 |
| CN | 205301342 U | 6/2016 |
| CN | 106290942 A | 1/2017 |
| CN | 107884591 A | 4/2018 |
| JP | 2003302401 A | 10/2003 |

OTHER PUBLICATIONS

Extended European Search Report for European Application No. 17936672.9, dated Oct. 30, 2020 (11 pages).

\* cited by examiner

AUTOMATIC CLEANING AND SEPARATING DEVICE

TECHNICAL FIELD

The present disclosure relates to the field of automatic immunoassay instrument for in vitro diagnosis, particularly to an automatic cleaning and separating device.

BACKGROUND

Fully automatic chemiluminescent immunoassay is an important technique for automatic analysis of in vitro diagnostics, which is mainly performed by the fully automatic chemiluminescent immunoassay analyzer. Fully automatic chemiluminescent immunoassay analyzer separates the free markers from the bound markers through a BF (Bound-Free) separation process carried out by the cleaning and separating device for the sake of removing unbound components from the reactants, and then proceeds with the luminescence reaction basing on the immune complex markers.

In order to achieve the BF separation function, the existing automatic cleaning and separating device usually includes an independently-driven cleaning carousel, a liquid suction mechanism, a liquid injecting mechanism, a mixing and gripping mechanism and a removing assembly, etc., which makes the cleaning and separating device and the analyzer incorporating the cleaning and separating device more complex, large and difficult to manufacture. Moreover, there are problems such as poor cleaning effect and low efficiency, thereby affecting the accuracy of analysis and detection.

SUMMARY

Accordingly, in view of the problems existing in the cleaning and separating devices, it is necessary to provide an automatic cleaning and separating device easy to manufacture with a simple structure, good BF separation effect, and high efficiency.

An automatic cleaning and separating device for removing unbound components in reactants in a reaction vessel is provided. The automatic cleaning and separating device includes a liquid injecting mixing mechanism, a removing assembly and a liquid suction mechanism. A liquid injecting driver is mounted on the liquid injecting mixing mechanism. A liquid suction driver is mounted on the liquid suction mechanism. The liquid injecting driver drives the liquid injecting mixing mechanism to move up and down to complete the liquid injection. The liquid suction driver drives the liquid suction mechanism to move up and down to complete the liquid suction. The removing assembly removes the reaction vessel on the liquid injecting mixing mechanism under the relative movements of the liquid suction mechanism and the liquid injecting mixing mechanism.

In an exemplary embodiment, the automatic cleaning and separating device further includes a rotary driving mechanism and a rotary plate mechanism. The rotary plate mechanism is mounted on the rotary driving mechanism, and the liquid injecting mixing mechanism is mounted on the rotary plate mechanism.

In an exemplary embodiment, the rotary driving mechanism includes a base plate, a rotary motor mounted on the base plate, and a rotary synchronous belt mounted on the rotary motor, the rotary synchronous belt is connected to the rotary plate mechanism.

In an exemplary embodiment, the rotary plate mechanism includes a thermal insulation pot and a rotary plate mounted on the rotary driving mechanism, the rotary plate is provided with a plurality of incubating slots and cleaning separating slots, the incubating slots are arranged on an inner circle on the rotary plate, and the cleaning separating slots are arranged on an outer circle on the rotary plate.

In an exemplary embodiment, a plate cover is mounted on the thermal insulation pot, and the plate cover is located above the incubating slot and the cleaning separating slot and is connected to the liquid injecting mixing mechanism.

In an exemplary embodiment, the plate cover is provided with a plurality of first access holes, second access holes, third access holes and fourth access holes, the first access holes are disposed opposite to a plurality of incubating slots therein, the second access holes are disposed opposite to the cleaning separating slot, the third access holes are for liquid suction, and the fourth access holes are for injecting liquid.

In an exemplary embodiment, the liquid suction driver of the liquid suction mechanism is connected to the liquid injecting mixing mechanism. In an exemplary embodiment, the liquid injecting mixing mechanism includes a support guiding post, a liquid injecting plate mounted on the support guiding post, a mixing driver mounted on the liquid injecting plate, at least two mixing assemblies and a liquid injecting needle, the mixing driver is connected to the mixing assembly, the liquid injecting needle goes through the liquid injecting plate from above the liquid injecting plate.

In an exemplary embodiment, the mixing assembly includes a synchronous belt pulley and a mixing chuck; the removing assembly includes a removing rod and a spring, the liquid injecting needle goes between the mixing assembly and the removing assembly.

In an exemplary embodiment, the liquid suction mechanism includes a liquid suction plate mounted on the support guiding post, and at least two liquid suction needles mounted on the liquid suction plate, the liquid suction plate is located above the liquid injecting plate.

The aforementioned automatic cleaning and separating devices include a rotary driving mechanism and a rotary plate mechanism mounted on the rotary mechanism, a liquid injecting mixing mechanism mounted on the rotary plate mechanism, a removing assembly and a liquid suction mechanism mounted on the liquid injecting mixing mechanism. In use, the automatic cleaning and separating device is mounted on an automatic chemiluminescence immunoassay analyzer. The automatic cleaning and separating device achieves the incubation, transferring and transporting, magnetic particles collection, liquid injection, liquid suction, mixing and removing integrally by way of the operation of the rotary driving mechanism, the rotary plate mechanism, the liquid injecting mixing mechanism, the removing assembly, and the liquid suction mechanism. The structure is simple and compact, and is easy to manufacture. Through the three power sources of the liquid injecting driver, the mixing driver, and the liquid suction driver, different steps of separation, liquid injection, mixing and liquid suction operations can be performed to the multiple reaction vessels simultaneously. The invention makes the operational procedure simpler and more reliable, the BF separating effect more excellent, the efficiency higher, the results of subsequent analysis and detection more accuracy.

REFERENCE SIGNS OF THE DRAWINGS

Figure 1:
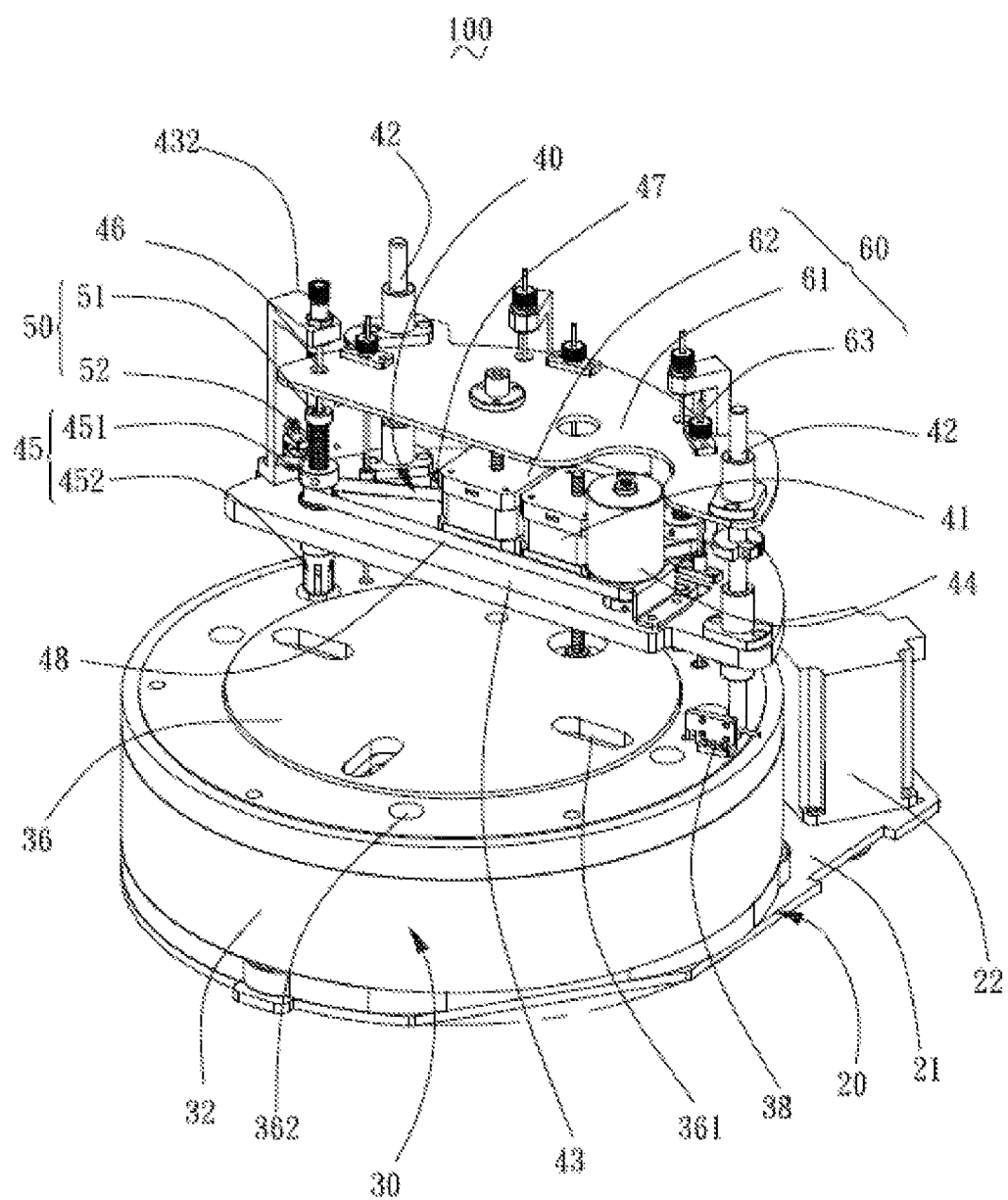
FIG. 1 is a schematic diagram of an automatic cleaning and separating device according to an exemplary embodiment of the present disclosure.

100—automatic cleaning and separating device, 20—rotary driving mechanism, 21—base plate, 22—rotary motor, 23—rotary synchronous belt, 30—rotary plate mechanism, 31—magnetic member, 32—thermal insulation pot, 33—rotary plate, 34—incubating slot, 35—cleaning separating slot, 36—plate cover, 38—initial liquid injecting assembly, 361—first access hole, 362—second access hole, 363—third access hole, 364—fourth access hole, 40—liquid injecting mixing mechanism, 41—liquid injecting driver, 42—support guiding post, 43—liquid injecting plate, 44—mixing driver, 45—mixing assembly, 46—liquid injecting needle, 47—guiding idle pulley, 48—mixing synchronous belt, 411—liquid injecting driving rod, 431—first guiding sleeve, 432—supporting arm, 451—synchronous belt pulley, 452—mixing chuck, 50—removing assembly, 51—removing rod, 52—spring, 60—liquid suction mechanism, 61—liquid suction plate, 62—liquid suction driver, 63—liquid suction needle, 64—second guiding sleeve, 70—reaction vessel.

DETAILED DESCRIPTION OF THE EMBODIMENTS

In order to facilitate understanding of the present disclosure, the present disclosure will be describe more fully below with reference to the accompanying drawings. Exemplary embodiments of the present disclosure are shown in the drawings. However, the invention may be implemented in many different forms and is not limited to the embodiments described herein. Rather, the purpose of providing these embodiments is to provide a more thorough understanding of the disclosure of the present disclosure.

It should be noted that when an element is referred to as being "fixed" to another element, it may be directly on the other element or there may be a central element. When an element is considered to be "connected" to another element, it may be directly connected to the other element or a central element may be present at the same time.

Unless otherwise defined, all technical and scientific terms used herein have the same meaning as commonly understood by those skilled in the art belonging to the present invention. The terms used herein in the specification of the invention are for the purpose of describing specific embodiments only and are not intended to limit the invention.

An automatic cleaning and separating device 100 of the present disclosure is used for cleaning reactants in a reaction vessel 70 and removing unbound components from the reactants in the reaction vessel 70. The automatic cleaning and separating device 100 includes a liquid injecting mixing mechanism 40, a removing assembly 50, and a liquid suction mechanism 60. A liquid injecting driver 41 is mounted on the liquid injecting mixing mechanism 40. A liquid suction driver 62 is mounted on the liquid suction mechanism 60, and the liquid injecting driver 41 drives the liquid injecting mixing mechanism 40 to move up and down to complete the liquid injection. The liquid suction driver 62 drives the liquid suction mechanism 60 to move up and down to complete the liquid suction. The removing assembly 50 removes the reaction vessel 70 from the liquid injecting mixing mechanism 40 through the relative movements of the liquid suction mechanism 60 and the liquid injecting mixing mechanism 40.

Referring to FIG. 1 to FIG. 4, the automatic cleaning and separating device 10 according to an exemplary embodiment of the present disclosure further includes a rotary driving mechanism 20 and a rotary plate mechanism 30. The rotary plate mechanism 30 is mounted on the rotary driving mechanism 20. The liquid injecting mixing mechanism 40 is mounted on the rotary plate mechanism 30. The liquid suction driver 62 of the liquid suction mechanism 60 is connected to the liquid injecting mixing mechanism 40. In other embodiments, the liquid suction driver 62 may be connected to the rotary driving mechanism 20 or other components of a fully-automatic chemiluminescent immunoassay analyzer. In use, the entire automatic cleaning and separating device 100 is mounted on the fully-automatic chemiluminescent immunoassay analyzer. It should be noted that, in other embodiments, the injecting mixing mechanism 40 may be mounted on the rotary driving mechanism 20 or other components of the fully automatic chemiluminescent immunoassay analyzer. The rotary plate mechanism 30 is used to place and transfer the reaction vessel 70, and the rotary driving mechanism 20 drives the rotary plate mechanism 30 to rotate so that the reaction vessel 70 passes through the liquid injecting mixing mechanism 40 and the liquid suction mechanism 60. The liquid suction mechanism 60 and the liquid injecting mixing mechanism 50 perform liquid suction, liquid injection, and mixing for a plurality of times in the reaction vessel 70, and finally realize the functions of cleaning and separation in immunoassay.

Figure 2:
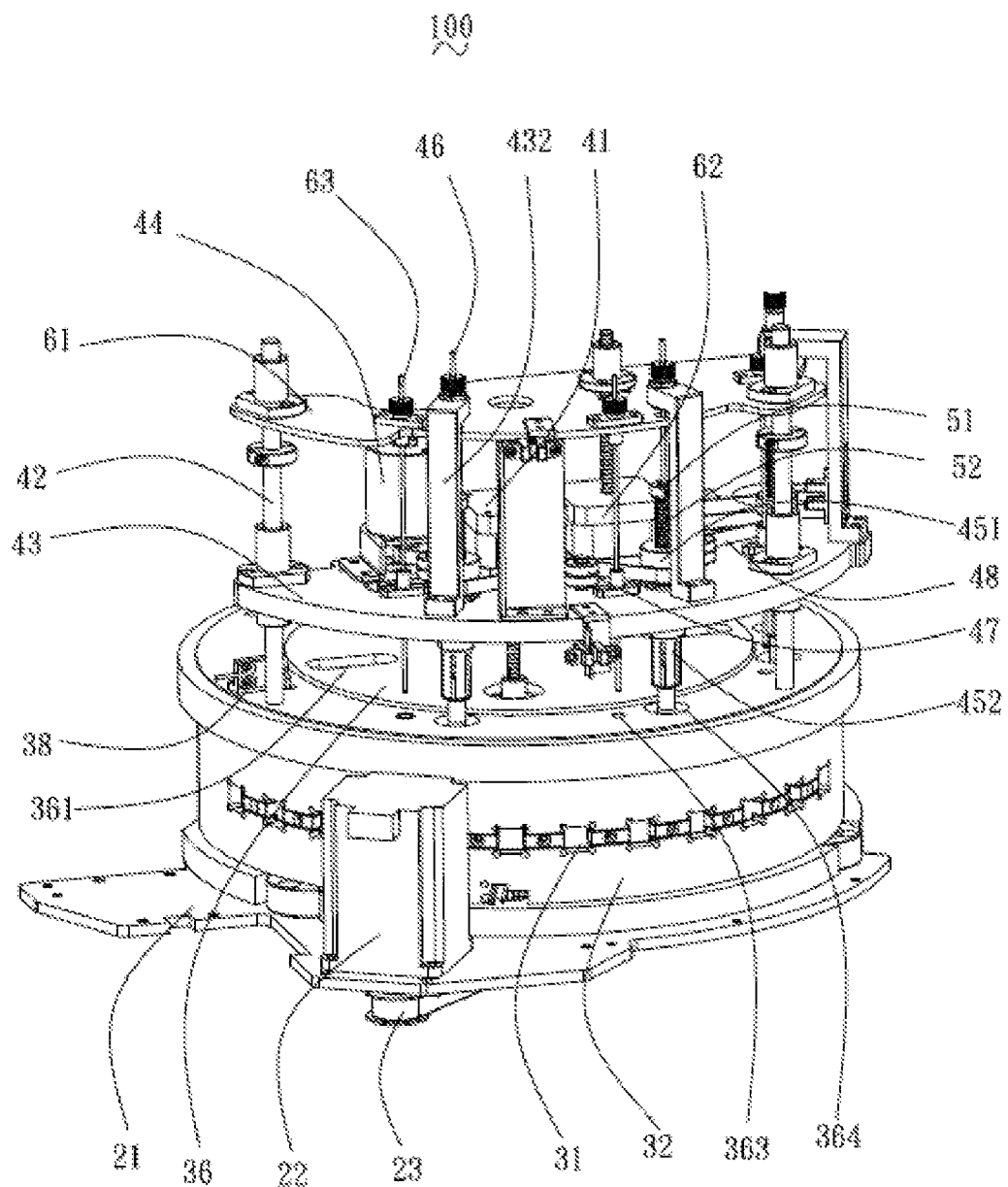
FIG. 2 is a schematic diagram of the automatic cleaning and separating device of FIG. 1 viewed from another aspect.
Figure 3:
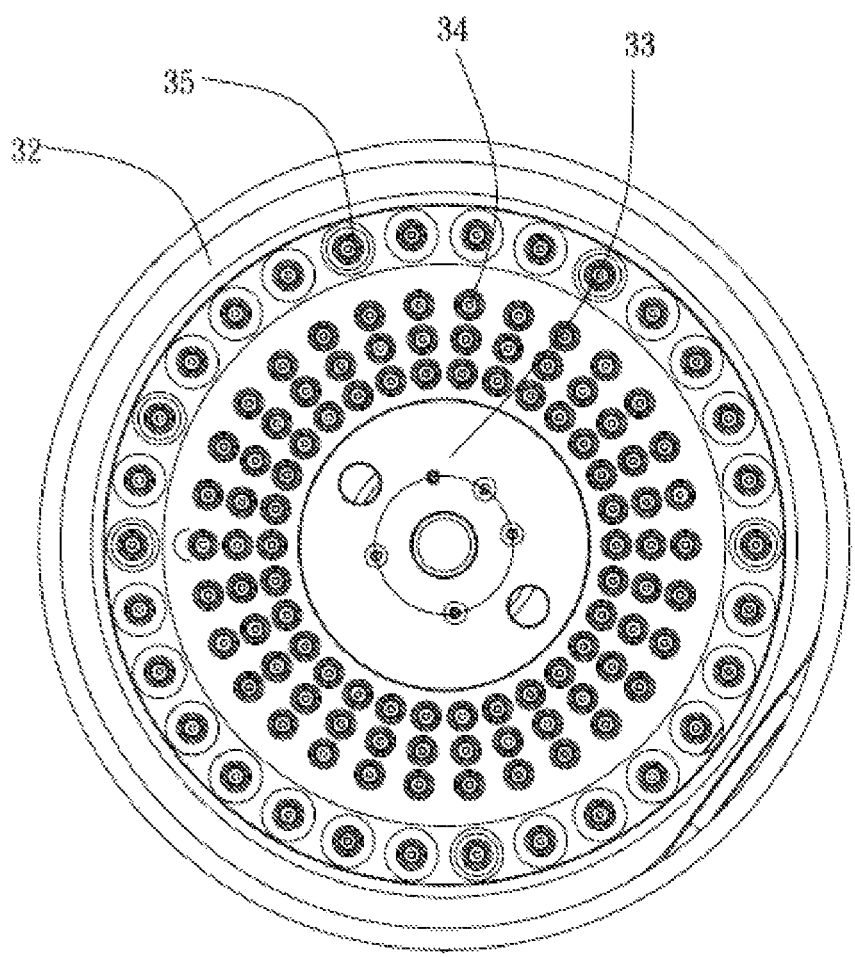
FIG. 3 is a partial schematic diagram of a rotary plate mechanism in the automatic cleaning and separating device of FIG. 1.

Referring to FIG. 1 and FIG. 2, the rotary driving mechanism 20 includes a base plate 21, a rotary motor 22 mounted on the base plate 21, and a rotary synchronous belt 23 mounted on the rotary motor 22. The rotary synchronous belt 23 is connected to the rotary plate mechanism 30. The rotary motor 22 is located at a corner of the base plate 21, so that the spatial positions of the rotary motor 22 and the rotary plate mechanism 30 can be arranged and the space occupation can be reduced.

Referring again to FIG. 3, a magnetic member 31 is mounted on a side of the rotary plate mechanism 30 close to the liquid injecting mixing mechanism 40. The magnetic member 31 provides a magnetic field environment, such that the paramagnetic particles in the reaction vessel 70 are collected to the inner wall of the reaction vessel 70 for a certain period of time, usually several seconds to tens of seconds, thereby ensuring that the reaction vessel 70 has to undergo a magnetic field for a period of time before each liquid suction in reaction vessel 70. In other embodiments, the magnetic member 31 may not be mounted on the rotary plate mechanism 30, but mounted on an external support mechanism to provide the magnetic field environment. The rotary plate mechanism 30 includes a thermal insulation pot 32 mounted on the base plate 21 and a rotary plate 33 mounted on the rotary driving mechanism 20. The rotary plate 33 is provided with a plurality of incubating slots 34 and a cleaning separating slot 35. The magnetic member 31 is mounted on a side of the thermal insulation pot 32 near the rotary motor 22. The rotary plate 33 is connected to the rotary synchronous belt 23, and the incubating slot 34 is arranged on an inner circle of the rotary plate 33. In this embodiment, three circles are arranged particularly, and the cleaning separating slot 35 is arranged on an outer circle on the rotary plate 33. In use, the incubating slot 34 and the cleaning separating slot 35 are used to place the reaction vessel 70. The reaction vessel 70 is driven by the rotary motor 22 and rotates along with the rotary plate 33, and moves forward to one or more positions with rotary plate 33' each rotation according to actual needs. Further, a plate cover 36 is mounted on the thermal insulation pot 32. The plate cover 36 is located above the incubating slot 34 and the cleaning separating slot 35, and is connected to the liquid injecting mixing mechanism 40. An initial liquid injecting assembly 38 is mounted on the plate cover 36. A relatively closed thermal insulating space is formed between the thermal insulation pot 32 and the plate cover 36. The initial liquid injecting assembly 38 performs the initial liquid injection before the reaction vessel 70 enters the liquid injecting mixing mechanism 40 and the liquid suction mechanism 60.

In addition, the plate cover 36 is provided with a plurality of first access holes 361 and second access holes 362. The first access holes 361 are arranged opposite to some incubating slots 34, and the second access holes 362 are arranged opposite to some cleaning separating slot 35. In the embodiment, there are three first access holes 361. The incubation time of the reaction vessel 70 on the incubating slot 34 can be determined according to the specific first access hole 361 which the reaction vessel 70 enters and the specific first access hole 361 which the reaction vessel 70 exits with the rotation of the rotary plate 33. The second access holes 362 are disposed opposite to some cleaning separating slots 34. In this embodiment, there are three second access holes 362, and the second access holes 362 are used for the reaction vessel to enter and exit the cleaning separating slot 34. In addition, the plate cover 36 is provided with a plurality of third access holes 363 and fourth access holes 364. The third access holes 363 are used for liquid suction and the fourth access holes 364 are used for liquid injection. There is a one-to-one match between the third access holes 363 and the fourth access holes 364. The liquid suction needle 63 goes through the third access holes 363 to aspirate the liquid from the reaction vessel 70, and liquid injecting needle 46 goes through the fourth access holes 364 to inject liquid into the reaction vessel 70. It will be understood by those skilled in the art that there is not necessarily a one-to-one match between the third access holes 363 and the fourth access holes 364, and in some embodiments, the third access holes 363 and the fourth access holes 364 may be merged to facilitate the liquid suction and liquid injection through the same position.

Figure 4:
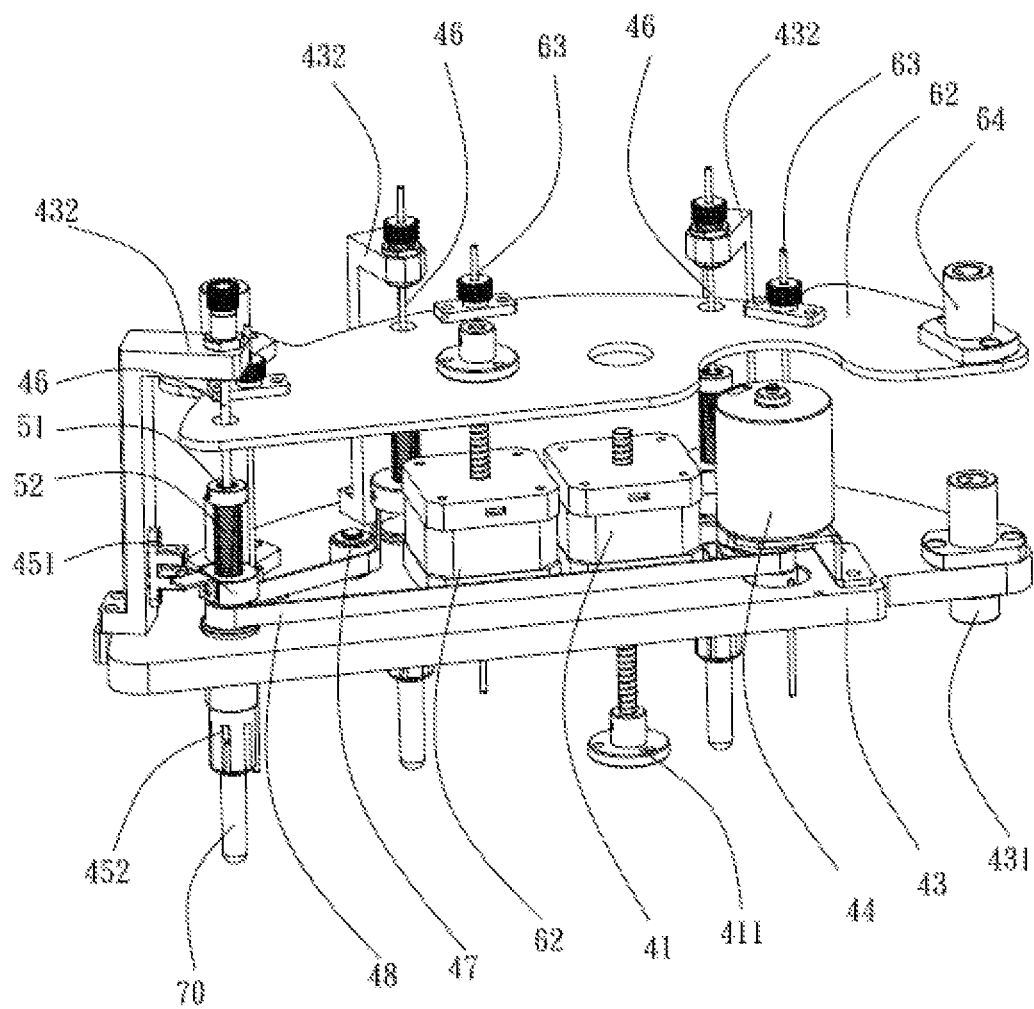
FIG. 4 is a partial schematic diagram of a liquid injecting mixing mechanism, a removing assembly, and a liquid suction mechanism in the automatic cleaning and separating device of FIG. 1.

Further referring to FIG. 4, the liquid injecting driver 41 is mounted on the liquid injecting mixing mechanism 40. The liquid injecting driver 41 abuts against the plate cover 36 and drives the liquid injecting mixing mechanism 40 to move up and down to complete the liquid injection. It will be understood by those skilled in the art that the liquid injecting mixing mechanism 40 may not necessarily abut against the plate cover 36, and in other embodiments, the liquid injecting mixing mechanism 40 may also be mounted on the base plate of the rotary driving mechanism 20. In this embodiment, the liquid injecting mixing mechanism 40 includes a support guiding post 42 connected to the plate cover 36, a liquid injecting plate 43 attached to the support guiding post 42, and a mixing driver 44 attached to the liquid injecting plate 43, at least two mixing assemblies 45, and at least two injecting needles 46. The injecting needle 46 can go through the mixing assembly 45 and the removing assembly 50 to access the fourth access hole 364. Furthermore, in this embodiment, there are three groups of the liquid injecting needle 46, and the three groups of liquid injection at different cleaning separating slots 35 can be simultaneously performed by the liquid injecting driver 41 and the liquid injecting plate 43. The mixing driver 44 is connected to the mixing assembly 45, and the liquid injecting needle 46 goes through the liquid injecting plate 43 from above the liquid injecting plate 43 to access the plate cover 36. A supporting arm 432 and a guiding idle pulley 47 are mounted on the injecting plate 43. The supporting arm 432 is located at an outer edge of the injecting plate 43 for supporting the injecting needle 46. The mixing assembly 45 includes a synchronous belt pulley 451 and a mixing chuck 452. The synchronous belt pulley 451 is mounted on the liquid injecting plate 43, and the mixing chuck 452 is connected to the synchronous belt pulley 451. The mixing chuck 452 clamps the reaction vessel 70 by a resilience force of the chuck.

The mixing driver 44 is provided with a mixing synchronous belt 48. The mixing synchronous belt 48 is wound around the guiding idle pulley 47 and the synchronous belt pulley 451. The mixing driver 44 and the mixing synchronous belt 48 can drive the reaction vessel 70 clamped in the mixing chuck 455 to rotate to mix the liquid in the reaction vessel 70. The support guiding post 42 is nested inside a first guiding sleeve 431 connected to the liquid injecting plate 43, and the liquid injecting driver 41 is provided with a liquid injecting driving rod 411 abuts against the plate cover 36. The first guiding sleeve 431 ensures that the liquid injecting plate 43 slides up and down smoothly under the action of the liquid injecting driver 41 and the liquid injecting driving rod 411. The liquid injecting driver 41 may be a driving motor or a driving cylinder. In this embodiment, the driving motor is selected, and the mixing driver 44 is a driving motor.

In this embodiment, the removing rod 51 is opposite rather than connected to the liquid suction mechanism 60. In other embodiments, the removing rod 51 connected to the liquid suction mechanism 60 also can be moved up and down in the through-hole of the synchronous belt pulley 452.

Referring to FIG. 4, the liquid suction mechanism 60 is provided with a liquid suction driver 62 connected to the liquid injecting mixing mechanism 40, and the liquid suction driver 62 drives the liquid suction mechanism 60 to move up and down to complete the liquid suction. The liquid suction mechanism 60 can move with the liquid injecting mixing mechanism 40 or can move relative to the liquid injecting mixing mechanism 40. It should be understood by those skilled in the art that, the liquid suction mechanism 60 may not be necessarily connected to the liquid injecting mixing mechanism 40. In other embodiments, the liquid suction mechanism 60 may also abut against the plate cover 36, or is mounted on the base plate 21 of the rotary driving mechanism 20. Further, the liquid suction mechanism 60 includes a liquid suction plate 61 mounted on the support guiding post 42, and at least two liquid suction needles 63 mounted on the liquid suction plate 61. The liquid suction plate 61 is located above the liquid injecting plate 43. The liquid suction driver 62 is connected to the liquid injecting plate 43. The liquid suction needle 36 goes downward through the liquid injecting plate 43 from the liquid suction plate 61. The liquid suction needle 63 and the liquid injecting needle 46 are one-to-one matches and located above the third access holes 363. A second guiding sleeve 64 that sleeve-fits the support guiding post 42 is mounted on the liquid suction plate 61, and the second guiding sleeve 64 can ensure smooth and stable up-and-down movement of the liquid suction plate 61. In this embodiment, there are three groups of the liquid suction needle 63, which are located above the plate cover 36 and can access to the third access holes 363. Three groups of liquid suction can simultaneously be performed at different cleaning separating slots with the movement of the liquid suction driver 62 and the liquid suction plate 61. The liquid suction driver 52 may be a driving motor or a driving cylinder, and the driving motor is selected in this embodiment.

The procedures of BF separation performed by the automatic cleaning and separating device 100 are as below:

Liquid suction process: the liquid injecting driver 41 drives the liquid injecting plate 43 to descend to a bottom position and then remains still, while the liquid suction needle 63 is lowered into the reaction vessel 70, but not to the bottom of the reaction vessel 70. Then, the liquid suction driver 62 drives the liquid suction plate 61 to continue to descend until the liquid suction needle 63 is lowered to the bottom of the reaction vessel 70, and the liquid suction needle 63 completes the liquid suction at the bottom of the reaction vessel 70.

Liquid injecting and mixing process: the liquid injecting driver 41 moves the liquid injecting plate 43 downward to the gripping height, and the mixing chuck 452 clamps the top of the reaction vessel 70 with the spring force. Then, the liquid injecting driver 41 moves the liquid injecting plate 43 upward to the liquid injecting and mixing height. The liquid injecting needle 46 injects liquid into the reaction vessel 70, and the mixing driver 44 drives the synchronous belt pulley 451, the mixing chuck 452 and consequentially drives the reaction vessel 70 to rotate by the mixing synchronous belt 48. The paramagnetic particles are resuspended and uniformly dispersed in the washing buffering liquid.

Removing process: while the liquid injecting driver 41 moves the liquid injecting plate 43 upward, the liquid suction driver 62 drives the liquid suction plate 61 to descend relative to the liquid injecting plate 43. When the liquid suction plate 61 pushes one end of the removing rod 51, the other end of the removing rod 51 pushes the reaction vessel 70 out of the mixing chuck 452. Then, the liquid injecting driver 41 continues to raise the liquid injecting plate 43 to the initial position, the liquid suction driver 62 drives the liquid suction plate 61 back to the initial position, and the removing rod 51 returns to the initial position under the restoring force of the spring 52.

In this embodiment, by way of the overall movement of the liquid suction plate 61 and the liquid injecting plate 43 as well as the relative movement between them, not only the liquid injection and the liquid suction are completed, but also the removing of the reaction vessel 70 on the mixing chuck 452 by the removing assembly is completed under the relative movement between the liquid suction plate 61 and the liquid injecting plate 43. This improvement reduces the running time of the liquid suction mechanism 60, improves the throughput of the analyzer, saves an independent driving mechanism exclusively for the removing, simplifies the structure of the analyzer, saves the space occupied, and lowers the cost. Therefore, the improvement makes the entire automatic cleaning and separating device 100 more compact and reliable.

When the automatic cleaning and separating device 100 is in use, the reaction vessel 70, which incubates on the incubating slot 34 of the rotary plate 33 for a period of time or has completed the incubation, is transferred by a mechanical gripper to pass through the first access hole 361 and the second access hole 362 to the cleaning separating slot 35. The rotary motor 22 drives the rotary plate 33 to rotate, and moves the reaction vessel 70 on the cleaning separating slot 35 to a position below the liquid injecting mixing mechanism 40 and the liquid suction mechanism 60. Meanwhile, the reaction vessel 70 enters the magnetic field region generated by the magnetic member 31 on the thermal insulation pot 32, and the magnetic particles in the reaction vessel 70 gradually gathered near the inner side wall of the reaction vessel, which is close to the side of the magnetic member 31, in the magnetic environment. When the reaction vessel 70 arrives at a position below the first liquid suction needle 63, the first liquid suction process starts. After the first liquid suction process is completed, the rotary plate 33 is rotated by the rotary motor 22 to advance by one position. The reaction vessel 70 with respect to which the first liquid suction process is about to be completed is transported to the next position below the first liquid injecting needle 46, and the first liquid injection process starts. Similarly, the reaction vessel 70 moves forward successively to the positions below the second liquid suction needle 63, the second liquid injecting needle 46, the third liquid suction needle 63, and the third liquid injecting needle 46, to complete the liquid suction process and the liquid injection process. The last liquid injecting needle 46 performs the signal reagent injection. The subsequently entering reaction vessel 70 also undergoes successively the first, second and third liquid suction processes and liquid injection processes. It should be understood by a person skilled in the art that in other embodiments, the number of test needles may vary according to the actual test requirements. For example, when the fourth BF separation is to be performed, four groups of liquid suction needles 63 and liquid injecting needles 46 may be correspondingly provided.

The automatic cleaning and separating device 100 includes a rotary driving mechanism 20, a rotary plate mechanism 30 attached to the rotary driving mechanism 20, a liquid injecting mixing mechanism 40 attached to the rotary plate mechanism 30, and the removing assembly 50 and the liquid suction mechanism 60 mounted on the liquid injecting mixing mechanism 40. In use, the entire automatic cleaning and separating device 100 is mounted on an automatic chemiluminescence immunoassay analyzer. The automatic cleaning and separating device 100 combines the operations of incubation, transferring and transporting, magnetic collection, liquid injecting, liquid suction, and mixing all in one, by way of the rotary driving mechanism 20, the rotary plate mechanism 30, the liquid injecting mixing mechanism 40, the removing assembly 50, and the liquid suction mechanism 60, thereby having a simple structure and easy for manufacturing. By the three power sources of the liquid injecting driver 41, the mixing driver 44, and the liquid suction driver 62, the plurality of reaction vessels 70 can be simultaneously operated in different stages of separation, liquid injection, mixing, and liquid suction. The operation procedure is simple and reliable, thereby having a good BF separating effect, high efficiency, and assured accuracy of subsequent analysis and detection.

It should be understood by an ordinary person skilled in the art, in order to accomplish liquid injection and liquid suction, the device of the present disclosure also relates to a syringe (pump), a liquid suction peristaltic pump (or vacuum pump), a fluid circuit and the like, and related circuits and software control units. These are common techniques in the art and will not be described in detail.

Although the respective embodiments have been described one by one, it shall be appreciated that the respective embodiments will not be isolated. Those skilled in the art can apparently appreciate upon reading the disclosure of the application that the respective technical features involved in the respective embodiments can be combined arbitrarily between the respective embodiments as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. An automatic cleaning and separating device for removing unbound components in a reactant in a reaction vessel, wherein the automatic cleaning and separating device comprises:
    a liquid injecting mixing mechanism, comprising:
        a support guiding post,
        a liquid injecting plate mounted on the support guiding post,
        a mixing driver mounted on the liquid injecting plate,
        a mixing assembly comprising a mixing chuck, the mixing chuck being configured to clamp the reaction vessel, and
        a liquid injecting needle, wherein the mixing driver is connected to the mixing assembly, the liquid injecting needle goes through the liquid injecting plate from above the liquid injecting plate;
    a liquid injecting driver mounted on the liquid injecting mixing mechanism, the liquid injection driver configured to perform liquid injection;
    a liquid suction mechanism mounted on the liquid injecting mixing mechanism, the liquid suction mechanism comprising a liquid suction driver configured to perform liquid suction, wherein the liquid suction mechanism comprises a liquid suction plate mounted on the support guiding post, the liquid suction plate is located above the liquid injecting plate; and
    a removing assembly configured to remove the reaction vessel clamped on the liquid injecting mixing mechanism from the liquid injecting mixing mechanism through relative movements between the liquid suction mechanism and the liquid injecting mixing mechanism, wherein the removing assembly comprises a removing rod, the liquid injecting needle goes through the mixing assembly and the removing assembly;
    wherein the liquid injecting driver is configured to complete liquid injection by driving the liquid injecting mixing mechanism to move up and down, and
    wherein the liquid suction driver is configured to complete liquid suction by driving the liquid suction mechanism to move up and down.

2. The automatic cleaning and separating device according to claim 1, further comprising a rotary driving mechanism and a rotary plate mechanism, wherein the rotary plate mechanism is mounted on the rotary driving mechanism, and the liquid injecting mixing mechanism is mounted on the rotary plate mechanism.

3. The automatic cleaning and separating device according to claim 2, wherein the rotary driving mechanism comprises a base plate, a rotary motor mounted on the base plate, and a rotary synchronous belt mounted on the rotary motor, the rotary synchronous belt is connected to the rotary plate mechanism.

4. The automatic cleaning and separating device according to claim 2, wherein the rotary plate mechanism comprises a thermal insulation pot and a rotary plate mounted on the rotary driving mechanism, the rotary plate is provided with a plurality of incubating slots and cleaning separating slots, the incubating slots are arranged on an inner circle on the rotary plate, and the cleaning separating slots are arranged on an outer circle on the rotary plate.

5. The automatic cleaning and separating device according to claim 4, wherein a plate cover is mounted on the thermal insulation pot, and the plate cover is located above the plurality of incubating slots and cleaning separating slots, and is connected to the liquid injecting mixing mechanism.

6. The automatic cleaning and separating device according to claim 5, wherein the plate cover is provided with a plurality of first access holes, second access holes, third access holes and fourth access holes, the first access holes are disposed opposite to some of the plurality of incubating slots, the second access holes are disposed opposite to some of the cleaning separating slots, the third access holes are configured for suction of liquid, and the fourth access holes are configured for injecting liquid.

7. The automatic cleaning and separating device according to claim 1, wherein the liquid suction driver of the liquid suction mechanism is connected to the liquid injecting mixing mechanism.

8. The automatic cleaning and separating device according to claim 1, wherein the liquid injecting mixing mechanism comprises at least two mixing assemblies.

* * * * *